United States Patent
Dong (10) Patent No.: US 9,207,374 B2
(45) Date of Patent: Dec. 8, 2015

(54) COLOR FILTERING ARRAY SUBSTRATE AND THE MANUFACTURING METHOD THEREOF

(71) Applicant: Shenzhen China Star Optoelectronics Technology Co., Ltd., Shenzhen, Guangdong (CN)

(72) Inventor: Chengcai Dong, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 130 days.

(21) Appl. No.: 14/003,460

(22) PCT Filed: Jul. 16, 2013

(86) PCT No.: PCT/CN2013/079439
§ 371 (c)(1),
(2) Date: Sep. 6, 2013

(87) PCT Pub. No.: WO2015/003401
PCT Pub. Date: Jan. 15, 2015

(65) Prior Publication Data
US 2015/0015835 A1      Jan. 15, 2015

(30) Foreign Application Priority Data
Jul. 10, 2013 (CN) .......................... 2013 1 0288932

(51) Int. Cl.
G02F 1/1335   (2006.01)
G02B 5/20     (2006.01)
G02F 1/1333   (2006.01)

(52) U.S. Cl.
CPC .......... *G02B 5/201* (2013.01); *G02F 1/133516* (2013.01); *G02F 1/133512* (2013.01); *G02F 2001/133388* (2013.01)

(58) Field of Classification Search
CPC .............. G02B 5/201; G02F 1/133516; G02F 1/133512; G02F 2001/133388
USPC .................................................. 349/106–111
See application file for complete search history.

(56) References Cited

U.S. PATENT DOCUMENTS

2001/0048491 A1* 12/2001 Tanaka et al. ..... G02F 1/136209
                                                                349/44
2004/0109110 A1*  6/2004 Kim et al. ..................... 349/106

* cited by examiner

*Primary Examiner* — Charles Chang
(74) *Attorney, Agent, or Firm* — Andrew C. Cheng (57) ABSTRACT

A color filtering array substrate and the manufacturing method thereof are disclosed. The color filtering array substrate includes a glass substrate (20) having a display area and a non-display area, a first metallic layer above the glass substrate, an insulation layer (22) above the first metallic layer, a second metallic layer above the insulation layer (22), a color filtering layer (23) formed between the insulation layer (22) and the second metallic layer, and a transparent conductive layer above the second metallic layer. The first metallic layer is for forming a first peripheral metallic layer (21) in the non-display area and to form a first internal metallic layer in the display area. The second metallic layer is for forming a second peripheral metallic layer (26) in the non-display area and to form a second internal metallic layer in the display area. The color filtering layer includes a color portion arranged in the display area and a blocking portion arranged in an interleaved portion of the first peripheral metallic layer and the second peripheral metallic layer.

12 Claims, 6 Drawing Sheets

COLOR FILTERING ARRAY SUBSTRATE AND THE MANUFACTURING METHOD THEREOF

BACKGROUND OF THE INVENTION

1. Field of the Invention

The present disclosure relates to liquid crystal display technology, and more particularly to a color filtering array substrate and the manufacturing method thereof.

2. Discussion of the Related Art

Liquid crystal displays (LCDs) typically are characterized by attributes including thin, power-saving, and low radiation. Thus, the LCDs are widely adopted by a plurality of electronic devices, such as mobile phones, PDA, digital cameras, displays of personal computers or notebooks.

Currently, most of the LCDs are backlight-type LCDs. Generally, the LCDs include a housing, a liquid crystal panel and a backlight module arranged within the housing. The liquid crystal panel includes a color filtering array substrate, a Thin Film Transistor (TFT) Array Substrate, and a liquid crystal layer arranged therebetween. By applying driving voltages toward the two substrates to control the alignment of the liquid crystal, the light beams from the backlight module are reflected so as to display images. As the liquid crystal does not emit light beams itself, the backlight module is needed to provide the light source so as to display images. Thus, the backlight module is a key component of the LCDs. Generally, backlight modules can be classified into edge-type and direct-lit type according to the incident locations of the light source. Regarding the direct-lit type backlight module, the Cold Cathode Fluorescent Lamp (CCFL) or Light Emitting Diode (LED) are arranged behind the liquid crystal panel to form a surface light source. With respect to the edge-type backlight module, the LED light bars are arranged at lateral rear sides of the liquid crystal panel. The light beams emitted from the LED light bar enter one side of the Light Guide Plate (LGP). After being reflected and diffused, the light beams emit out from the light emitting surface and then operates as the surface light source of the liquid crystal panel.

Figure 1:
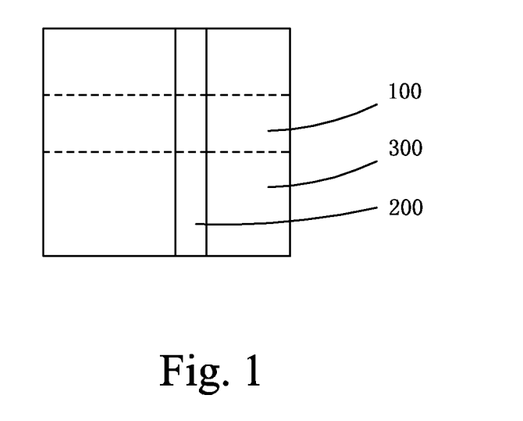
FIG. 1 is a top view of the conventional liquid crystal panel.
Figure 2:
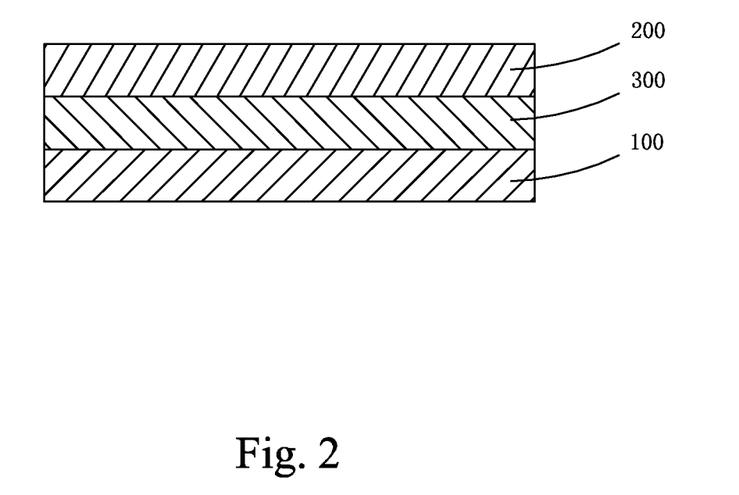
FIG. 2 is a cross sectional view of the liquid crystal panel of FIG. 1.

Electro-Static discharge (ESD) is a key factor of the manufacturing of the TFT array substrate. Referring to FIGS. 1 and 2, a gate metallic layer (M1) 100 and a source/drain metallic layer (M2) 200 are interleaved or overlie to form a capacitor, which adopts the insulation layer to be the dielectric, such as SiNx. In the manufacturing process, the gate metallic layer 100 and the source/drain metallic layer 200 accumulate charge such that the voltage is generated therebetween. When the voltage equals to a breakdown voltage of the capacitor, the voltage may pass through the insulation layer 300 between the gate metallic layer 100 and the source/drain metallic layer 200. Under such circumstance, the gate metallic layer 100 and the source/drain metallic layer 200 are short connected and result in a general ESD effect. Such ESD effect may cause the liquid crystal panel malfunction.

The electrical field intensity (E) between two ends of the capacitors is calculated by the equation of: $E=U/d$, wherein U represents a voltage difference between the two ends, and D represents the distance between the two ends. When the electrical field intensity (E) is too large and equals to the breakdown voltage of the capacitor, the ESD effect may occur. Thus, decreasing the electrical field intensity (E) is one solution to avoid the ESD effect. However, the voltage difference (U) between the gate metallic layer 100 and the source/drain metallic layer 200 is unpredictable and uncontrollable.

Figure 3:
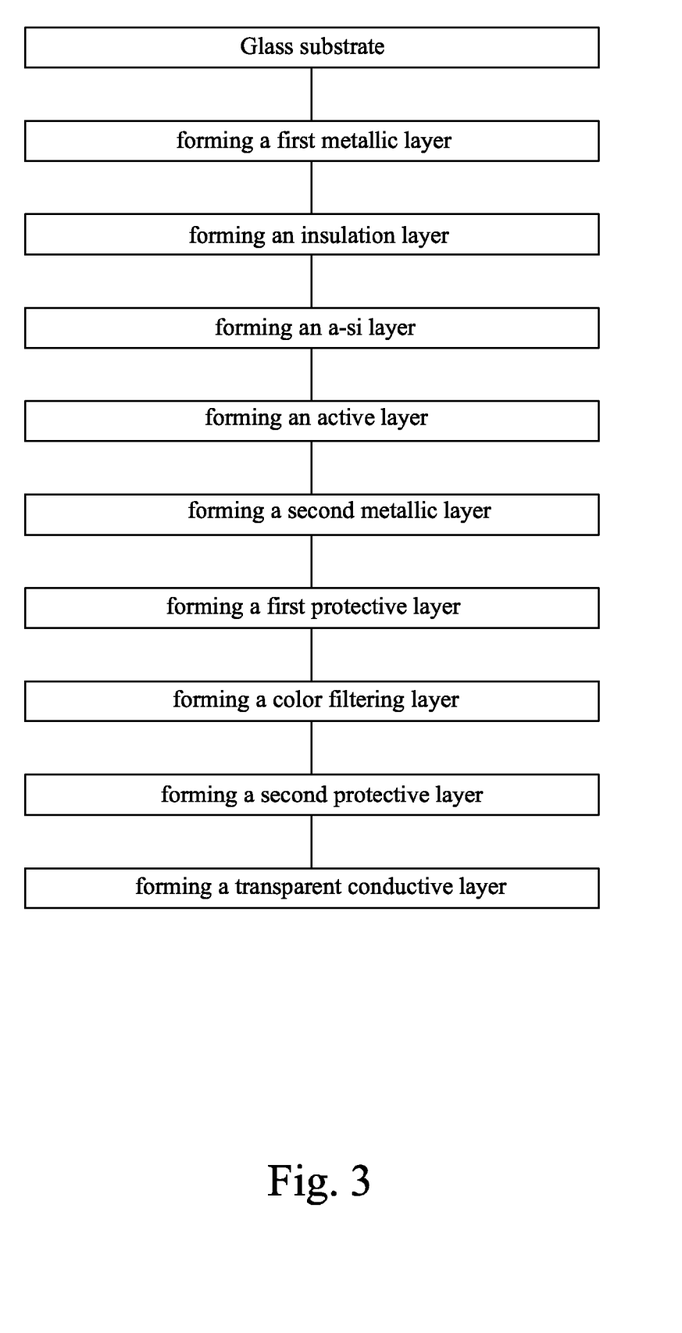
FIG. 3 is a flowchart illustrating the conventional manufacturing process of the color filtering array substrate.

Recently, one new solution named "Color Filter on Array (COA)" is proposed, which relates to directly bonding the color filtering array substrate onto the TFT array substrate. As such, the alignment of the TFT array substrate and the color filtering array substrate can be controlled. As shown in FIG. 3, the manufacturing process includes the following steps. A first metallic layer is arranged above the glass substrate, and an insulation layer is formed above the first metallic layer. An amorphous silicon layer is formed above the insulation layer. An active layer is formed above the amorphous silicon layer. A second metallic layer is formed above the active layer. A first protective layer is formed above the second metallic layer. A color filtering layer is formed above the first protective layer. A second protective layer is formed above the color filtering layer. A transparent conductive layer is formed above the second protective layer so as to form the color filtering array substrate. Afterward, the color filtering array substrate is assembled with an opposite arranged substrate with liquid crystal filled therebetween to form the liquid crystal panel. It is to be noted that the opposite arranged substrate does not include the color filtering array substrate.

However, the above configuration may result in electrostatic effect in the interleaved portions between the gate metallic layer and the source/drain metallic layer, and which will shorten the lifetime of the liquid crystal panel.

SUMMARY

The object of the invention is to provide a color filtering array substrate and the manufacturing method thereof. The color filtering layer is arranged between a first metallic layer and a second metallic layer to enlarge the distance between the first peripheral metallic layer and the second peripheral metallic layer. In this way, the electrical field intensity (E) formed in the interleaved portions of the first peripheral metallic layer and the second peripheral metallic layer in the non-display area can be decreased as to reduce the ESD effect and the inference therebetween. Therefore, not only the display performance is enhanced, and the lifetime of the LCDs is prolonged.

Another object of the invention is to provide the manufacturing method of the color filtering array substrate. The manufacturing method is simple and efficient. Not only the display performance is enhanced, the lifetime of the color filtering array substrate is also prolonged. As such, the cost can be controlled.

In one aspect, a color filtering array substrate includes:

a glass substrate comprising a display area and an non-display area arranged in an periphery of the glass substrate;

a first metallic layer formed above the glass substrate to form a first peripheral metallic layer in the non-display area and to form a first internal metallic layer in the display area;

an insulation layer formed above the glass substrate and the first metallic layer;

a second metallic layer formed above the insulation layer to form a second peripheral metallic layer in the non-display area and to form a second internal metallic layer in the display area;

a color filtering layer formed between the insulation layer and the second metallic layer, the color filtering layer comprises a color portion arranged in the display area and a blocking portion arranged in an interleaved portion of the first peripheral metallic layer and the second peripheral metallic layer; and a transparent conductive layer is formed above the second metallic layer.

The color filtering array substrate further includes:

a first protective layer formed above the color filtering layer;

an active layer formed above the first protective layer, and the second metallic layer is arranged above the active layer;

a second protective layer formed above the second metallic layer and the first protective layer; and a planarization layer formed above the second protective layer, and the transparent conductive layer is above the planarization layer.

The color filtering array substrate further comprises an amorphous silicon layer arranged between the first protective layer and the active layer.

Wherein the blocking portion comprises a single-layer, double-layer or triple-layer structure, the blocking portion is a red, blue, or green color-blocking layer when the blocking portion is of the single-layer structure, the blocking portion comprises two out of the red, blue, and green color-blocking layers when the blocking portion is of the double-layer structure, and the blocking portion comprises the red, blue, and green color-blocking layers when the blocking portion is of the triple-layer structure.

In another aspect, a color filtering array substrate includes:

a glass substrate comprising a display area and an non-display area arranged in the periphery of the glass substrate;

a first metallic layer formed above the glass substrate to form a first peripheral metallic layer in the non-display area and to form a first internal metallic layer in the display area;

an insulation layer formed above the glass substrate and the first metallic layer;

a second metallic layer formed above the insulation layer to form a second peripheral metallic layer in the non-display area and to form a second internal metallic layer in the display area;

a color filtering layer formed between the insulation layer and the second metallic layer, the color filtering layer comprises a color portion arranged in the display area and a blocking portion arranged in an interleaved portion of the first peripheral metallic layer and the second peripheral metallic layer;

a transparent conductive layer is formed above the second metallic layer;

a first protective layer formed above the color filtering layer;

an active layer formed above the first protective layer, and the second metallic layer is arranged above the active layer;

a second protective layer formed above the second metallic layer and the first protective layer;

a planarization layer formed above the second protective layer, and the transparent conductive layer is above the planarization layer; and an amorphous silicon layer arranged between the first protective layer and the active layer.

Wherein the blocking portion comprises a single-layer, double-layer or triple-layer structure, the blocking portion is a red, blue, or green color-blocking layer when the blocking portion is of the single-layer structure, the blocking portion comprises two out of the red, blue, and green color-blocking layers when the blocking portion is of the double-layer structure, and the blocking portion comprises the red, blue, and green color-blocking layers when the blocking portion is of the triple-layer structure.

In another aspect, a manufacturing method of a color filtering array substrate includes:

step (1) for providing a glass substrate comprising a display area and a non-display area arranged in an periphery of the glass substrate;

step (2) for forming a first metallic layer above the glass substrate, and patterning the first metallic layer by a mask process to form a first peripheral metallic layer in the non-display area and to form a first internal metallic layer in the display area, and the first internal metallic layer comprises a gate and one electrode for storing capacitance;

step (3) for forming an insulation layer above the first metallic layer and the glass substrate, and for patterning the insulation layer by the mask process;

step (4) for forming a color filtering layer above the insulation layer and for patterning the color filtering layer by the mask process to form a color portion in the display area and for forming a blocking portion in the non-display area;

step (5) for forming a first protective layer above the color filtering layer and for patterning the first protective layer by the mask process;

step (6) for forming an active layer above the first protective layer and for patterning the active layer to form a channel of the thin film transistor (TFT);

step (7) for forming a second metallic layer above the active layer and for patterning the second metallic layer to form a second peripheral metallic layer in the non-display area and to form a second internal metallic layer in the display area, the second internal metallic layer comprises source/drain of the TFT, and the blocking portion is arranged in an interleaved portion of the first peripheral metallic layer and the second peripheral metallic layer;

step (8) for forming a second protective layer above the second metallic layer and the first protective layer and for patterning the second protective layer by the mask process; and step (9) for forming a transparent conductive layer above the second protective layer and for patterning the transparent conductive layer by the mask process to form another electrode for the storing capacitance, and the electrode connects to the source/drain of the TFT.

Wherein step (8) further comprises forming a planarization layer above the second protective layer and for patterning the planarization layer by the mask process, and the transparent conductive layer formed by step (9) is above the planarization layer.

Wherein step (5) further comprises forming an amorphous silicon layer above the first protective layer and applying a doping process to the amorphous silicon layer, and the active layer formed by step (6) is above the amorphous silicon layer.

Wherein the blocking portion comprises a single-layer, double-layer or triple-layer structure, the blocking portion is a red, blue, or green color-blocking layer when the blocking portion is of the single-layer structure, the blocking portion comprises two out of the red, blue, and green color-blocking layers when the blocking portion is of the double-layer structure, and the blocking portion comprises the red, blue, and green color-blocking layers when the blocking portion is of the triple-layer structure.

Wherein the mask process comprises coating, exposure, lithography and etching processes.

Wherein the insulation layer, the first protective layer and the second protective layer are formed by depositing SiNx, and the transparent conductive layer is made by Indium Tin Oxides (ITO).

In view of the above, by arranging the color filtering layer between the first metallic layer and the second metallic layer, the blocking portion of the color filtering layer is arranged in the interleaved portion portions of the first peripheral metallic layer and the second peripheral metallic layer in the non-display area. In this way, the distance between the first peripheral metallic layer and the second peripheral metallic layer in the non-display area is increased so as to decrease the electrical field intensity (E) formed in the interleaved portions of the first peripheral metallic layer and the second peripheral metallic layer in the non-display area. Thus, the ESD effect is reduced and the lifetime of the color filtering array substrate is prolonged. At the same time, the capacitance generated between the first peripheral metallic layer and the second peripheral metallic layer is decreased such that the signals inference between the first peripheral metallic layer and the second peripheral metallic layer in the non-display area is also decreased. Thus, the display performance is enhanced.

In order to further understand the characteristics of the invention as well as technical content, see the following detailed description of the present invention and the accompanying drawings, drawings, however, for reference purposes only and description of use is not intended to limit the present invention.

BRIEF DESCRIPTION OF THE DRAWINGS

Below in conjunction with the accompanying drawings, through a specific embodiment of the present invention is described in detail, and will make apparent the technical solution of the present invention, and other beneficial effects.

DETAILED DESCRIPTION OF THE EMBODIMENTS

Embodiments of the invention will now be described more fully hereinafter with reference to the accompanying drawings, in which embodiments of the invention are shown.

In one embodiment, the ESD effect is reduced by increasing the distance between two ends (the first peripheral metallic layer 21 and the second peripheral metallic layer 26).

Figure 4:
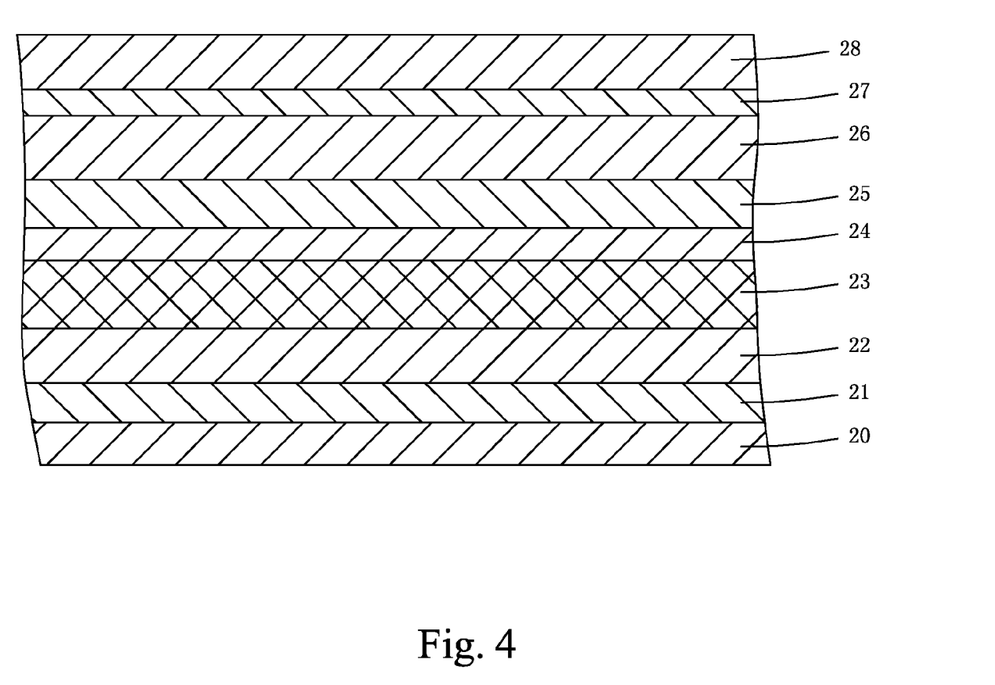
FIG. 4 is a schematic view of the color filtering array substrate in accordance with one embodiment.
Figure 5:
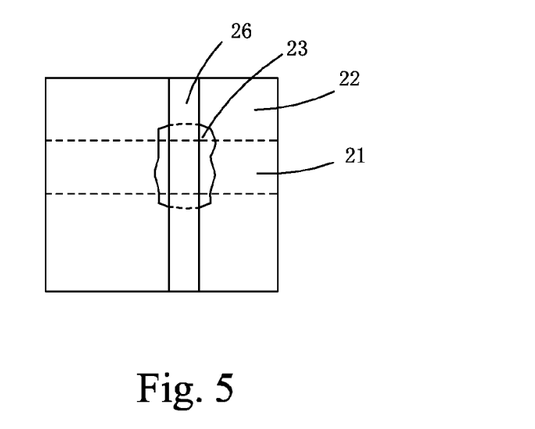
FIG. 5 is a top view of the color filtering array substrate of FIG. 4.
Figure 6:
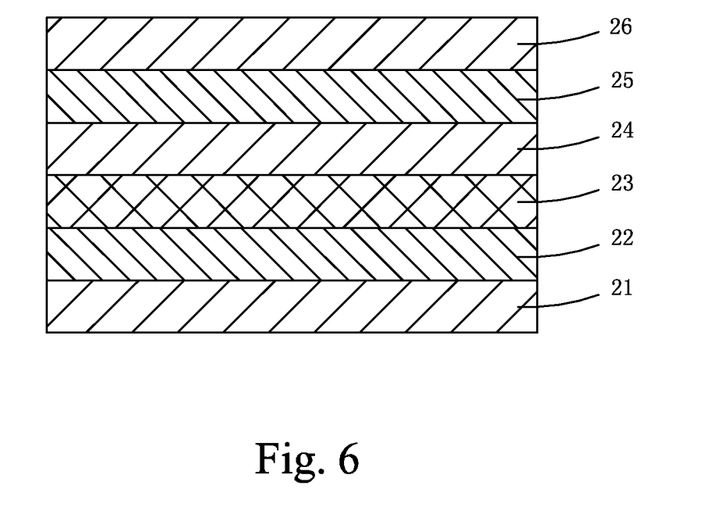
FIG. 6 is a schematic view of the interleaved portions of the first peripheral metallic layer and the second peripheral metallic layer in accordance with the first embodiment.

FIGS. 4 to 6 show the color filtering array substrate in accordance with one embodiment. Though the color filtering array substrate relates to the COA technology, but the color filtering array substrate is different from the conventional color filtering array substrate. By arranging the color filtering layer 23 between the first metallic layer and the second metallic layer, the blocking portion 50 of the color filtering layer 23 is arranged in the interleaved portions of the first peripheral metallic layer 21 and the second peripheral metallic layer 26 in the non-display area. In this way, the distance between the first peripheral metallic layer 21 and the second peripheral metallic layer 26 in the non-display area is increased so as to decrease the electrical field intensity (E) formed in the interleaved portions of the first peripheral metallic layer 21 and the second peripheral metallic layer 26 in the non-display area. Thus, the ESD effect is reduced and the lifetime of the color filtering array substrate is prolonged.

Referring to FIGS. 4 to 6, the color filtering array substrate includes a glass substrate 20, a first peripheral metallic layer 21, an insulation layer 22, a color filtering layer 23, a first protective layer 24, an active layer 25, a second peripheral metallic layer 26, a second protective layer 27, a planarization layer 28, and a transparent conductive layer (not shown). The glass substrate 20 includes a display area and an on-display area. The first metallic layer is formed above the glass substrate 20 by sputtering process to form the first peripheral metallic layer 21 in the non-display area and to form a first internal metallic layer (not shown) in the display area. The first internal metallic layer includes a gate and an electrode for storing capacitance. The insulation layer 22 is formed above the glass substrate 20 and the first metallic layer by vapor deposition process. The active layer 25 is formed above the insulation layer 22 by vapor deposition process to operate as a channel of the thin film transistor (TFT). The second metallic layer is formed above the active layer 25 by sputtering process to form the second peripheral metallic layer 26 in the non-display area and to form a second internal metallic layer (not shown) in the display area. The second internal metallic layer includes a source/drain of the TFT. The color filtering layer 23 is formed between the insulation layer 22 and the active layer 25 by mask process. The color filtering layer 23 includes a color portion arranged in the display area and a blocking portion 50 arranged in the interleaved portion of the first peripheral metallic layer 21 and the second peripheral metallic layer 26. The transparent conductive layer is arranged above the second metallic layer and couples to the source/drain of the TFT to operate as another electrode for storing capacitance.

Figure 7:
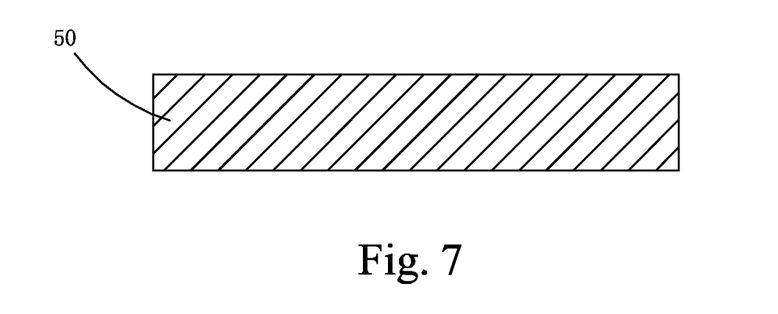
FIG. 7 is a schematic view of the blocking portion of the color filtering layer of the color filtering array substrate in accordance with one embodiment.

The color filtering layer 23 is formed by repeated coating, exposure, lithography and etching processes so as to form the color portion in the display area and to form the blocking portion 50 in the non-display area. The color portion is for displaying color information, and the blocking portion 50 is for increasing a distance between the first peripheral metallic layer 21 and the second peripheral metallic layer 26 in the non-display area. As such, the electrical field intensity (E) formed between the first peripheral metallic layer 21 and the second peripheral metallic layer 26 in the non-display area is decreased, and the ESD effect is also reduced. Specifically, the blocking portion 50 includes a single-layer, double-layer or triple-layer structure. FIG. 7 is a schematic view of the blocking portion in accordance with the one embodiment. As shown, the blocking portion is of the single-layer structure. In the embodiment, the blocking portion 50 may be one of a red, blue and green color-blocking layer. When forming the color portion of the color filtering layer 23, at least one color-blocking layer arranged in the interleaved portion of the first peripheral metallic layer 21 and the second peripheral metallic layer 26 in the non-display area is not etched to form the blocking portion 50. As to whether the red, blue, or green color-blocking layer has to be remained, the determination can be made in accordance with real scenarios.

Figure 8:
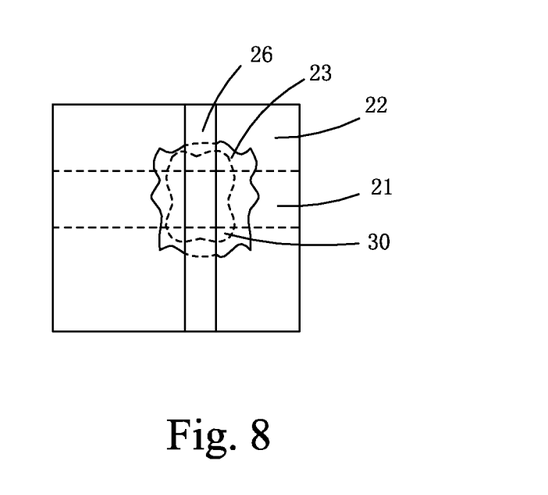
FIG. 8 is a top view of the color filtering array substrate in accordance with another embodiment.
Figure 9:
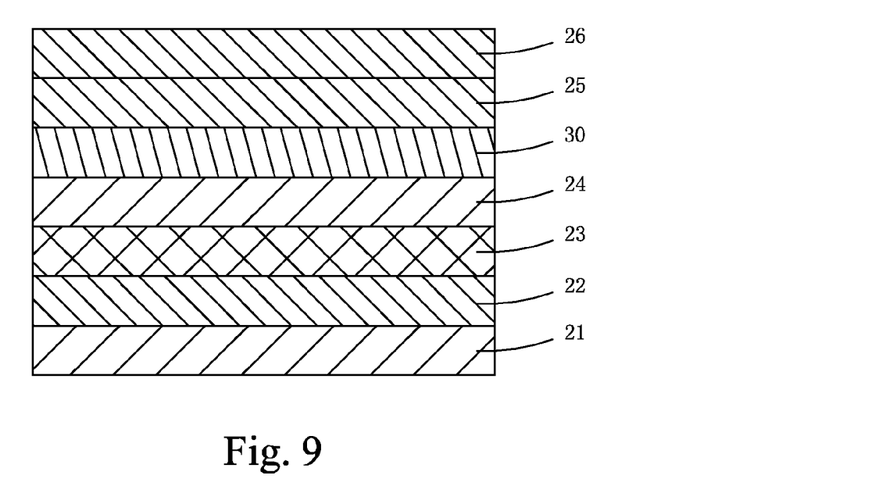
FIG. 9 is a schematic view of the interleaved portions of the first peripheral metallic layer and the second peripheral metallic layer in accordance with another embodiment.

Referring to FIGS. 8 and 9, only the first peripheral metallic layer 21, the second peripheral metallic layer 26, the insulation layer 22, the color filtering layer 23 and the amorphous silicon layer (a-si layer) 30 are shown for simplicity. In one embodiment, the color filtering array substrate further includes the amorphous silicon layer 30 arranged between the first protective layer 24 and the active layer 25. The amorphous silicon layer 30 is between the first metallic layer and the second metallic layer to increase the distance between the first peripheral metallic layer 21 and the second peripheral metallic layer 26. Thus, the electrical field intensity (E) formed between the first peripheral metallic layer 21 and the second peripheral metallic layer 26 is decreased so as to reduce the ESD effect. The amorphous silicon layer 30 can be formed by conventional processes.

It is to be noted that as the color filtering layer 23 is arranged between the first metallic layer and the second metallic layer, the distance between the first peripheral metallic layer 21 and the second peripheral metallic layer 26 in the non-display area is increased. The capacitance is calculated by the equation of $C=(\in S)/(4\pi kd)$, wherein E represents the dielectric constant, $\pi$ represents the circular constant, k represents the electrostatic force constant, d represents the distance between two parallel sheets (the first peripheral metallic layer 21 and the second peripheral metallic layer 26), and S represents the dimension that the two parallel sheets directly face toward each other, that is, the dimension of the interleaved portion of the first peripheral metallic layer 21 and the second peripheral metallic layer 26. It can be understood that the capacitance generated between the first peripheral metallic layer 21 and the second peripheral metallic layer 26 is decreased such that the signals inference between the first peripheral metallic layer 21 and the second peripheral metallic layer 26 in the non-display area is also decreased. Thus, the display performance is enhanced.

Figure 10:
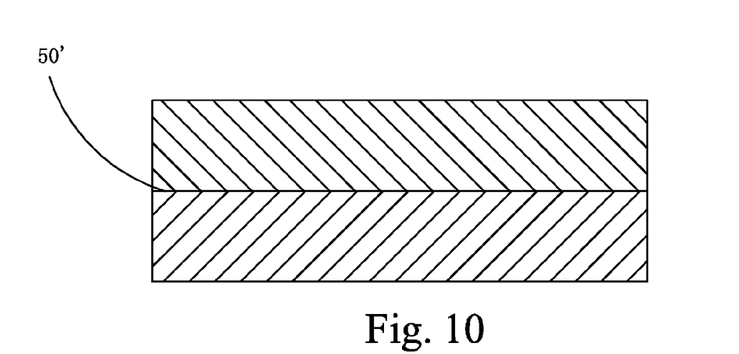
FIG. 10 is a schematic view of the blocking portion of the color filtering layer of the color filtering array substrate in accordance with another embodiment.

FIG. 10 is a schematic view of the blocking portion 50' of the color filter substrate in accordance with another embodiment. In the embodiment, the blocking portion 50' is double-layer structure. The blocking portion 50' includes two out of the red color-blocking layer, the blue color-blocking layer, and the green color-blocking layer. The locations of the two color-blocking layers are configured in accordance with real scenarios. For example, while the blocking portion 50' includes the blue color-blocking layer and the green color-blocking layer, the blue color-blocking layer can be arranged above or below the green color-blocking layer. The blocking portion 50' of the double-layer structure has better performance than the single-layer structure.

Figure 11:
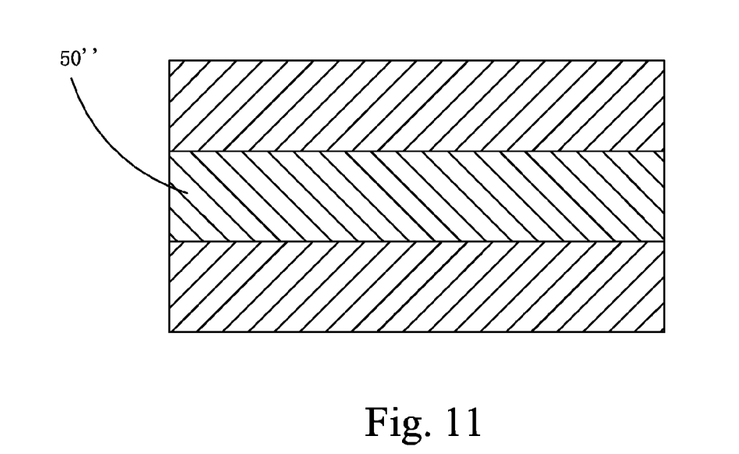
FIG. 11 is a schematic view of the blocking portion of the color filtering layer of the color filtering array substrate in accordance with another embodiment.

FIG. 11 is a schematic view of the blocking portion 50' of the color filtering layer 23 in accordance with another embodiment. In the embodiment, the blocking portion 50' includes the triple-layer structure having the red color-blocking layer, the blue color-blocking layer, and the green color-blocking layer. The locations of the three color-blocking layers are configured in accordance with real scenarios. For example, the red color-blocking layer, the blue color-blocking layer, and the green color-blocking layer are arranged in turn in an upward direction or in a downward direction. The blocking portion 50' of the triple-layer structure has better performance than the single-layer and double-layer structure.

Figure 12:
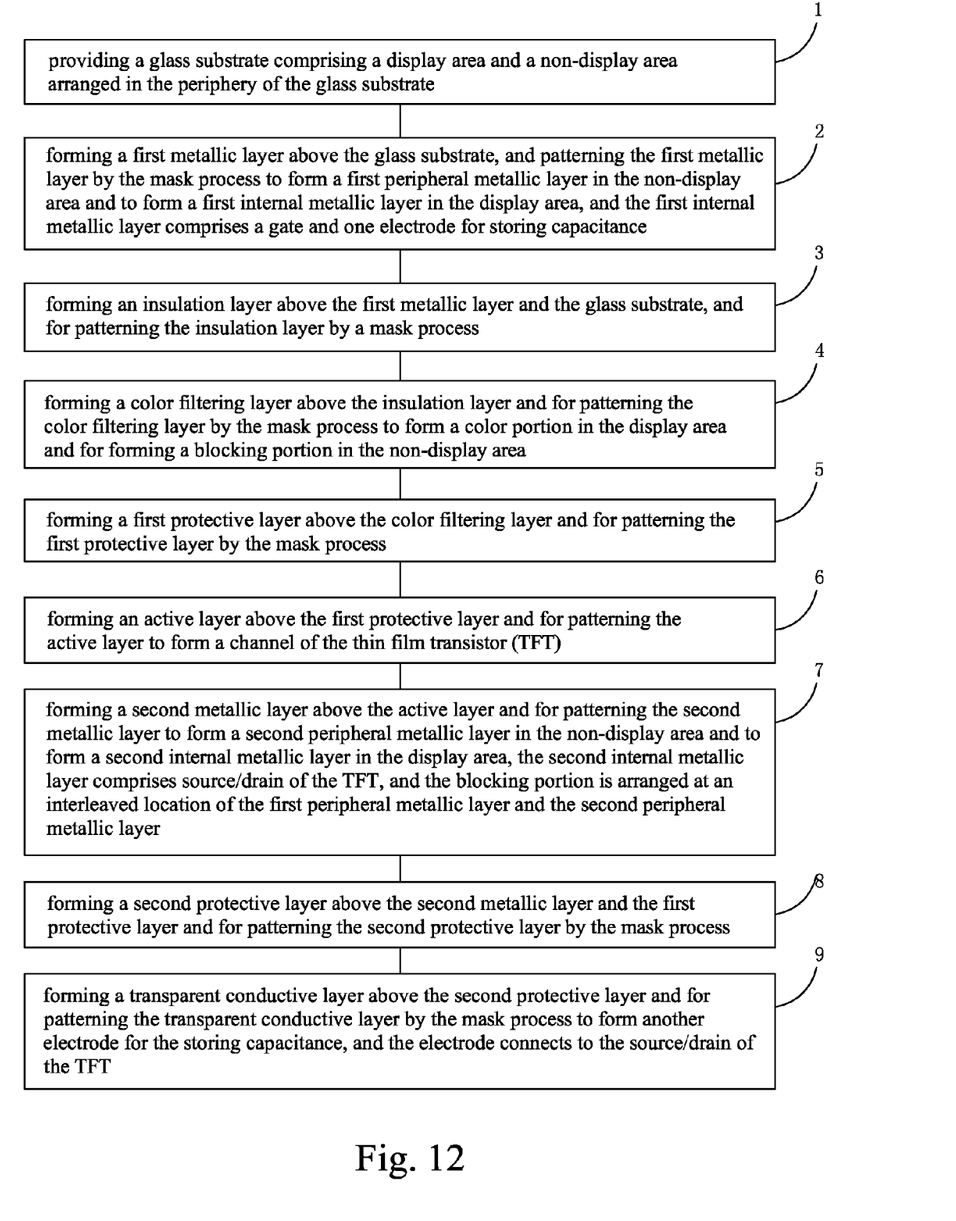
FIG. 12 is a flowchart illustrating the manufacturing method of the color filtering array substrate in accordance with another embodiment.

FIG. 12 is a flowchart illustrating the manufacturing method of the color filtering array substrate in accordance with one embodiment. Also referring to FIGS. 4 to 7, the method includes the following steps.

In step S1, the glass substrate 20 is provided. The glass substrate 20 includes a display area and a non-display area arranged in the periphery of the glass substrate 20. The material of the glass substrate 20 is the same with those adopted in the current technology.

In step S2, the first metallic layer is formed above the glass substrate 20. The first metallic layer is patterned by the mask process to form the first peripheral metallic layer 21 in the non-display area and to form the first internal metallic layer in the display area. The first internal metallic layer includes the gate and one electrode for storing capacitance.

The first metallic layer is formed above the glass substrate 20 by sputtering process or vapor deposition process. The above mask process includes coating, lithography, and etching adopted in the current technology.

In step S3, the insulation layer 22 is formed above the first metallic layer and the glass substrate 20 and is then patterned by the mask process.

The insulation layer 22 is formed by depositing SiNx.

In step S4, the color filtering layer 23 is formed above the insulation layer 22 and is then patterned to form the color portion in the display area and to form the blocking portion 50 in the non-display area.

The color filtering layer 23 is formed by repeated coating, exposure, lithography and etching processes so as to form the color portion in the display area and to form the blocking portion 50 in the non-display area. The color portion is for displaying color information, and the blocking portion 50 is for increasing a distance between the first peripheral metallic layer 21 and the second peripheral metallic layer 26 in the non-display area. As such, the electrical field intensity (E) formed between the first peripheral metallic layer 21 and the second peripheral metallic layer 26 in the non-display area is decreased, and the ESD effect is also reduced. Specifically, the blocking portion 50 may be single-layer, double-layer or triple-layer structure. FIG. 7 is a schematic view of the blocking portion in accordance with one embodiment. As shown, the blocking portion is of the single-layer structure. In the embodiment, the blocking portion 50 may be one of a red, blue and green color-blocking layer. When forming the color portion of the color filtering layer 23, at least one color-blocking layer arranged in the interleaved portion of the first peripheral metallic layer 21 and the second peripheral metallic layer 26 in the non-display area is not etched to form the blocking portion 50. As to whether the red, blue, or green color-blocking layer has to be remained, the determination can be made in accordance with real scenarios.

In step S5, the first protective layer 24 is formed above the color filtering layer 23 and is patterned by the mask process.

The first protective layer 24 is formed by depositing SiNx.

In step S6, the active layer 25 is formed above the first protective layer 24 and is patterned by the mask process to form the channel of the TFT.

In step S7, the second metallic layer is formed above the active layer 25 and is patterned by the mask process to form the second peripheral metallic layer 26 in the non-display area and to form the second internal metallic layer in the display area. The second internal metallic layer includes the source/drain of the TFT. The blocking portion 50 is arranged in an interleaved portion of the first peripheral metallic layer 21 and the second peripheral metallic layer 26

In step S8, the second protective layer 27 is formed above the second metallic layer and the first protective layer 24, and the second protective layer 27 is patterned by the mask process.

Specifically, the second protective layer 27 is formed above the second metallic layer and the first protective layer 24, and then the second protective layer 27 is patterned by the mask process. Afterward, the planarization layer 28 is formed above the second protective layer 27, and the planarization layer 28 is patterned by the mask process.

The second protective layer 27 is formed by depositing SiNx.

In step S9, the transparent conductive layer is formed above the second protective layer 27, and is patterned by the mask process to form another electrode for the storing capacitance. The another electrode connects to the source/drain of the TFT.

Specifically, the transparent conductive layer is formed above the planarization layer 28.

In the embodiment, the transparent conductive layer is an Indium Tin Oxides (ITO) layer formed by sputtering process.

FIG. 10 is a schematic view of the blocking portion 50' of the color filtering layer 23 in accordance with another embodiment. In the embodiment, the blocking portion 50' is double-layer structure. The blocking portion 50' includes two out of the red color-blocking layer, the blue color-blocking layer, and the green color-blocking layer. The locations of the two color-blocking layers are configured in accordance with real scenarios. For example, while the blocking portion 50' includes the blue color-blocking layer and the green color-blocking layer, the blue color-blocking layer can be arranged above or below the green color-blocking layer. The blocking portion 50' of the double-layer structure has better performance than the single-layer structure.

FIG. 11 is a schematic view of the blocking portion 50' of the color filtering layer 23 in accordance with another embodiment. In the embodiment, the blocking portion 50' includes the triple-layer structure including the red color-blocking layer, the blue color-blocking layer, and the green color-blocking layer. The locations of the three color-blocking layers are configured in accordance with real scenarios. For example, the red color-blocking layer, the blue color-blocking layer, and the green color-blocking layer are arranged in turn in an upward direction or in a downward direction. The blocking portion 50' of the triple-layer structure has better performance than the single-layer and double-layer structure.

Referring to FIGS. 8 and 9, it is to be noted that step S5 further includes forming the amorphous silicon layer 30 above the first protective layer 24. Also, a doping process is applied to the amorphous silicon layer 30. The active layer 25 is formed above the amorphous silicon layer 30. Comparing to the above-mentioned method, by arranging the amorphous silicon layer 30 between the first metallic layer and the second metallic layer and by applying the doping process to the amorphous silicon layer 30, the amorphous silicon layer 30 further contributes to the increase of the distance between the first peripheral metallic layer 21 and the second peripheral metallic layer 26. As such, the electrical field intensity (E) can be decreased as to reduce the ESD effect.

In view of the above, by arranging the color filtering layer between the first metallic layer and the second metallic layer and by arranging the blocking portion of the color filtering layer in the interleaved portions of the first peripheral metallic layer and the second peripheral metallic layer 26, the distance between the first peripheral metallic layer and the second peripheral metallic layer is increased. The electrical field intensity (E) formed between the first peripheral metallic layer and the second peripheral metallic layer in the non-display area can be decreased as to reduce the ESD effect. At the same time, the capacitance generated between the first peripheral metallic layer and the second peripheral metallic layer is decreased. As such, the signals inference, occurring during operations of the color filtering array substrate, between the first peripheral metallic layer and the second peripheral metallic layer is decreased. Thus, the display performance is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A color filtering array substrate, comprising:
   a glass substrate comprising a display area and an non-display area arranged in an periphery of the glass substrate;
   a first metallic layer formed above the glass substrate to form a first peripheral metallic layer in the non-display area and to form a first internal metallic layer in the display area;
   an insulation layer formed above the glass substrate and the first metallic layer;
   a second metallic layer formed above the insulation layer to form a second peripheral metallic layer in the non-display area and to form a second internal metallic layer in the display area;
   a color filtering layer formed between the insulation layer and the second metallic layer, the color filtering layer comprises a color portion arranged in the display area and a blocking portion arranged in an interleaved portion of the first peripheral metallic layer and the second peripheral metallic layer; and
   a transparent conductive layer is formed above the second metallic layer.

2. The color filtering array substrate as claimed in claim 1, further comprises:
   a first protective layer formed above the color filtering layer;
   an active layer formed above the first protective layer, and the second metallic layer is arranged above the active layer;
   a second protective layer formed above the second metallic layer and the first protective layer;
   and a planarization layer formed above the second protective layer, and the transparent conductive layer is above the planarization layer.

3. The color filtering array substrate as claimed in claim 2, further comprises an amorphous silicon layer arranged between the first protective layer and the active layer.

4. The color filtering array substrate as claimed in claim 1, wherein the blocking portion comprises a single-layer, double-layer or triple-layer structure, the blocking portion is a red, blue, or green color-blocking layer when the blocking portion is of the single-layer structure, the blocking portion comprises two out of the red, blue, and green color-blocking layers when the blocking portion is of the double-layer structure, and the blocking portion comprises the red, blue, and green color-blocking layers when the blocking portion is of the triple-layer structure.

5. A color filtering array substrate, comprising:
   a glass substrate comprising a display area and an non-display area arranged in the periphery of the glass substrate;
   a first metallic layer formed above the glass substrate to form a first peripheral metallic layer in the non-display area and to form a first internal metallic layer in the display area;
   an insulation layer formed above the glass substrate and the first metallic layer;

a second metallic layer formed above the insulation layer to form a second peripheral metallic layer in the non-display area and to form a second internal metallic layer in the display area;

a color filtering layer formed between the insulation layer and the second metallic layer, the color filtering layer comprises a color portion arranged in the display area and a blocking portion arranged in an interleaved portion of the first peripheral metallic layer and the second peripheral metallic layer;

a transparent conductive layer is formed above the second metallic layer;

a first protective layer formed above the color filtering layer;

an active layer formed above the first protective layer, and the second metallic layer is arranged above the active layer;

a second protective layer formed above the second metallic layer and the first protective layer;

a planarization layer formed above the second protective layer, and the transparent conductive layer is above the planarization layer; and an amorphous silicon layer arranged between the first protective layer and the active layer.

6. The color filtering array substrate as claimed in claim 5, wherein the blocking portion comprises a single-layer, double-layer or triple-layer structure, the blocking portion is a red, blue, or green color-blocking layer when the blocking portion is of the single-layer structure, the blocking portion comprises two out of the red, blue, and green color-blocking layers when the blocking portion is of the double-layer structure, and the blocking portion comprises the red, blue, and green color-blocking layers when the blocking portion is of the triple-layer structure.

7. A manufacturing method of a color filtering array substrate, comprising:

step (1) for providing a glass substrate comprising a display area and a non-display area arranged in a periphery of the glass substrate;

step (2) for forming a first metallic layer above the glass substrate, and patterning the first metallic layer by a mask process to form a first peripheral metallic layer in the non-display area and to form a first internal metallic layer in the display area, and the first internal metallic layer comprises a gate and one electrode for storing capacitance;

step (3) for forming an insulation layer above the first metallic layer and the glass substrate, and for patterning the insulation layer by the mask process;

step (4) for forming a color filtering layer above the insulation layer and for patterning the color filtering layer by the mask process to form a color portion in the display area and for forming a blocking portion in the non-display area;

step (5) for forming a first protective layer above the color filtering layer and for patterning the first protective layer by the mask process;

step (6) for forming an active layer above the first protective layer and for patterning the active layer to form a channel of the thin film transistor (TFT);

step (7) for forming a second metallic layer above the active layer and for patterning the second metallic layer to form a second peripheral metallic layer in the non-display area and to form a second internal metallic layer in the display area, the second internal metallic layer comprises source/drain of the TFT, and the blocking portion is arranged in an interleaved portion of the first peripheral metallic layer and the second peripheral metallic layer;

step (8) for forming a second protective layer above the second metallic layer and the first protective layer and for patterning the second protective layer by the mask process; and step (9) for forming a transparent conductive layer above the second protective layer and for patterning the transparent conductive layer by the mask process to form another electrode for the storing capacitance, and the electrode connects to the source/drain of the TFT.

8. The manufacturing method as claimed in claim 7, wherein step (8) further comprises forming a planarization layer above the second protective layer and for patterning the planarization layer by the mask process, and the transparent conductive layer formed by step (9) is above the planarization layer.

9. The manufacturing method as claimed in claim 7, wherein step (5) further comprises forming an amorphous silicon layer above the first protective layer and applying a doping process to the amorphous silicon layer, and the active layer formed by step (6) is above the amorphous silicon layer.

10. The manufacturing method as claimed in claim 7, wherein the blocking portion comprises a single-layer, double-layer or triple-layer structure, the blocking portion is a red, blue, or green color-blocking layer when the blocking portion is of the single-layer structure, the blocking portion comprises two out of the red, blue, and green color-blocking layers when the blocking portion is of the double-layer structure, and the blocking portion comprises the red, blue, and green color-blocking layers when the blocking portion is of the triple-layer structure.

11. The manufacturing method as claimed in claim 7, wherein the mask process comprises coating, exposure, lithography and etching processes.

12. The manufacturing method as claimed in claim 7, wherein the insulation layer, the first protective layer and the second protective layer are formed by depositing SiNx, and the transparent conductive layer is made by Indium Tin Oxides (ITO).

* * * * *